United States Patent
Ko

(10) Patent No.: US 9,127,420 B2
(45) Date of Patent: Sep. 8, 2015

(54) INTELLIGENT CONSTRUCTION CONE

(75) Inventor: Chien-Ho Ko, Neipu Hsiang (TW)

(73) Assignee: National Pingtung University of Science and Technology, Pingtung County (TW)

( * ) Notice: Subject to any disclaimer, the term of this patent is extended or adjusted under 35 U.S.C. 154(b) by 576 days.

(21) Appl. No.: 13/592,465

(22) Filed: Aug. 23, 2012

(65) Prior Publication Data

US 2013/0214924 A1    Aug. 22, 2013

(30) Foreign Application Priority Data

Feb. 21, 2012   (TW) .............................. 101105671 A

(51) Int. Cl.
| | |
|---|---|
| G08B 19/00 | (2006.01) |
| E01F 9/012 | (2006.01) |
| H05B 37/02 | (2006.01) |
| E01F 9/016 | (2006.01) |

(52) U.S. Cl.
CPC .............. *E01F 9/0122* (2013.01); *E01F 9/016* (2013.01); *H05B 37/0218* (2013.01); *H05B 37/0227* (2013.01); *Y02B 20/46* (2013.01); *Y02B 20/48* (2013.01)

(58) Field of Classification Search
CPC .... E01F 9/0122; E01F 9/016; H05B 37/0218; H05B 37/0227; Y02B 20/46; Y02B 20/48
USPC ............... 340/522, 907, 908, 908.1; 362/183, 362/191, 249.02, 253
See application file for complete search history.

(56) References Cited

U.S. PATENT DOCUMENTS

| | | | | |
|---|---|---|---|---|
| 5,521,595 | A * | 5/1996 | Totten et al. .................. | 340/908 |
| 5,755,174 | A * | 5/1998 | Freeman ..................... | 116/63 C |
| 6,753,762 | B1 * | 6/2004 | Jorba Gonzalez ............ | 340/333 |
| 7,876,237 | B2 * | 1/2011 | Chen .......................... | 340/908.1 |
| 7,905,622 | B2 * | 3/2011 | Nielson et al. ................ | 362/158 |
| 7,997,764 | B1 * | 8/2011 | Nielson ..................... | 362/249.02 |
| 2010/0265699 | A1 * | 10/2010 | Nielson et al. ................ | 362/158 |
| 2010/0277900 | A1 * | 11/2010 | Cohen .......................... | 362/183 |
| 2011/0058898 | A1 * | 3/2011 | Beh .................................. | 404/6 |

* cited by examiner

*Primary Examiner* — Steven Lim
*Assistant Examiner* — Sisay Yacob
(74) *Attorney, Agent, or Firm* — Alan D. Kamrath; Kamrath IP Lawfirm, P.A.

(57) ABSTRACT

An intelligent construction cone includes a light pervious body rotatable relative to a body. A rotating device is mounted to the light pervious body and driven by a driving device to rotate the light pervious body. A distance detector sends a distance signal to a controller coupled to the driving device. The distance detector is jointly rotatable with the light pervious body to eliminate detection dead angle. A warning device is coupled to the controller and generates a warning message responsive to the distance signal. A lighting device is coupled to the controller and provides illumination. A light sensor and a humidity sensor are coupled to the controller and detect environmental brightness and environmental humidity, respectively. The warning message and intensity of the illumination are adjusted according to a distance between an object and the distance detector, the environmental brightness, and the environmental humidity.

8 Claims, 5 Drawing Sheets

INTELLIGENT CONSTRUCTION CONE

BACKGROUND OF THE INVENTION

The present invention relates to a warning device and, more particularly, to a construction safety warning device.

Construction cones are generally used in road construction to avoid dangers resulting from breaking of vehicles or passersby into the construction area. Conventional traffic cones generally include a conspicuous color mark providing a passive warning effect or even include a reflective strip for reflecting ambient light beams to provide an enhanced warning effect. However, the conventional construction cones depending on ambient lighting can not provide expected warning effects in the night or bad weather.

Some conventional construction cones include a distance sensor to enhance the warning effect. When an object approaches a construction cone with a distance sensor, the distance sensor activates an alarm device to produce sounds for warning purposes. However, in addition to limitation in the alarming distance, the range and angle of alarm are also limited by the installation position of the distance sensor. Thus, breaking of vehicles and passersby into the road construction area still occurs.

In another approach, a warning lamp is added on top of a conventional construction cone. However, the eyesight decreases while the sunshine fades and the rainfall (humidity) increases in bad weather. The traffic cones with warning lamps can not change the warning effect and the illumination effect in response to the change of the environment. Thus, the traffic cones with warning lamps consume more electricity in fine weather but fail to provide the desired warning effect in bad weather.

BRIEF SUMMARY OF THE INVENTION

The present invention provides an intelligent construction cone that overcomes the disadvantages of the conventional construction cones including poor warning effect, incapability of adjustment responsive to the environmental change, and limited alarm distance, range, and angle of the distance sensors.

An intelligent construction cone according to the present invention includes a body, a light pervious body, a controller, a distance detector, a warning device, a lighting device, a light sensor, and a humidity sensor. The body includes a conic portion, a neck portion, and a base. An end of the neck portion is connected to the conic portion. The other end of the neck portion is detachably connected to the base. The base includes a track surrounding the neck portion. The light pervious body is rotatable relative to the body and includes a passage. The neck portion is extended through the passage and connected to the base. The rotating device is mounted to the light pervious body and drives the light pervious body to rotate along the track. The driving device is connected to the rotating device and drives the rotating device to rotate. The controller is coupled to the driving device by signal connection. The distance detector is coupled to the controller by signal connection and sends a distance signal to the controller. The distance detector is jointly rotatable with the light pervious body to eliminate detection dead angle. The warning device is coupled to the controller by signal connection and generates a warning message responsive to the distance signal. The lighting device is coupled to the controller by signal connection and provides illumination. The light sensor is coupled to the controller by signal connection and detects environmental brightness. The humidity sensor is coupled to the controller by signal connection and detects environmental humidity. The warning message and intensity of the illumination are adjusted according to a distance between an object and the distance detector, the environmental brightness, and the environmental humidity.

In an embodiment, the base further includes a guiding groove. A positioning peg is mounted to the light pervious body and located corresponding to the track. A guiding wheel is rotatably mounted to the positioning peg. The lighting device is a light-emitting diode. The warning device is a buzzer. The neck portion is a cylinder extending from a bottom side of the conic portion. The distance detector is a supersonic rangefinder. A solar power generating device is mounted to the body and provides the light pervious body with electricity.

By actively changing the volume of the warning sounds and the intensity of illumination in response to the environmental change, the disadvantages of conventional construction cones providing poor warning effect by using passive reflection are eliminated. Furthermore, the rotating device allows the distance detector to proceed with 360° detection of objects adjacent to the body, significantly increasing the alarm distance, range, and angle and effectively reducing the number of the expensive distance detector.

The present invention will become clearer in light of the following detailed description of illustrative embodiments of this invention described in connection with the drawings.

DETAILED DESCRIPTION OF THE INVENTION

Figure 1:
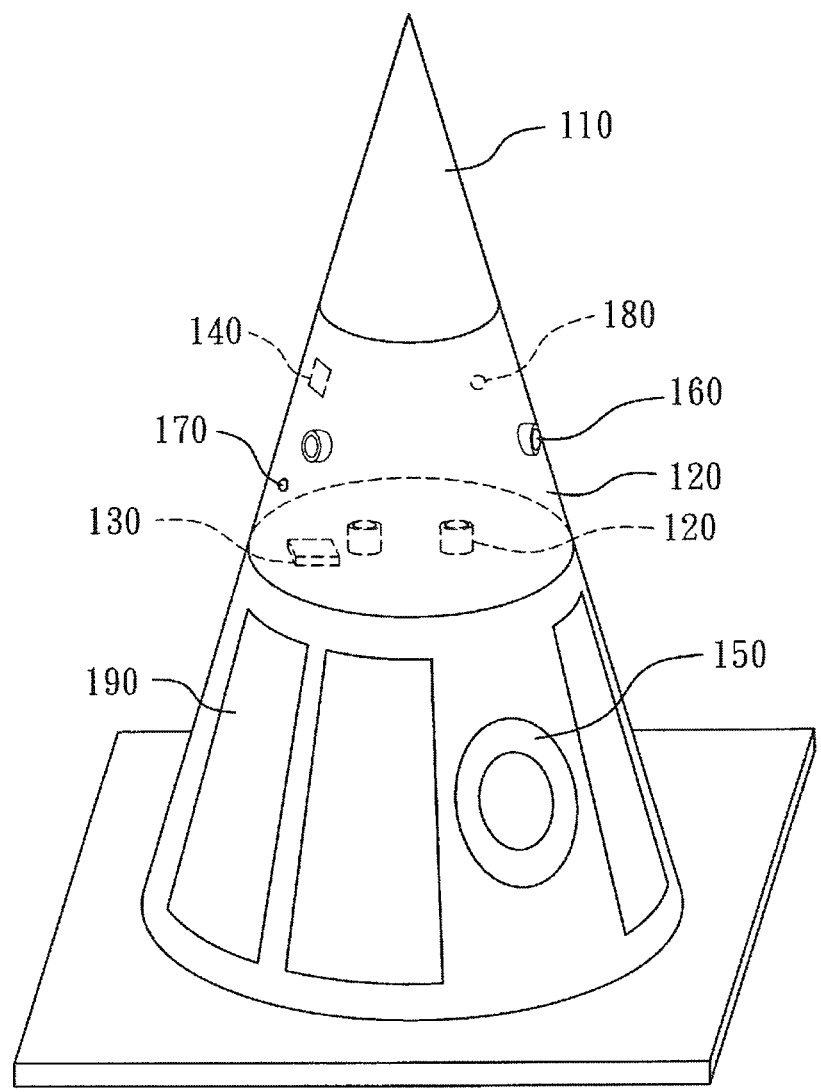
FIG. 1 is a perspective view of an intelligent construction cone of an embodiment according to the present invention.

FIG. 1 is a perspective view of an intelligent construction cone of an embodiment according to the present invention. As can be seen from FIG. 1, the intelligent construction cone 100 includes a body 110, a light pervious body 120, a controller 130, a distance detector 140, a warning device 150, and a lighting device 160. In addition to providing an enhanced warning effect by provision of an active light source, the embodiment also eliminates the detection dead angle of the distance detector 140 by using the light pervious body 120 having a specific design.

Figure 2:
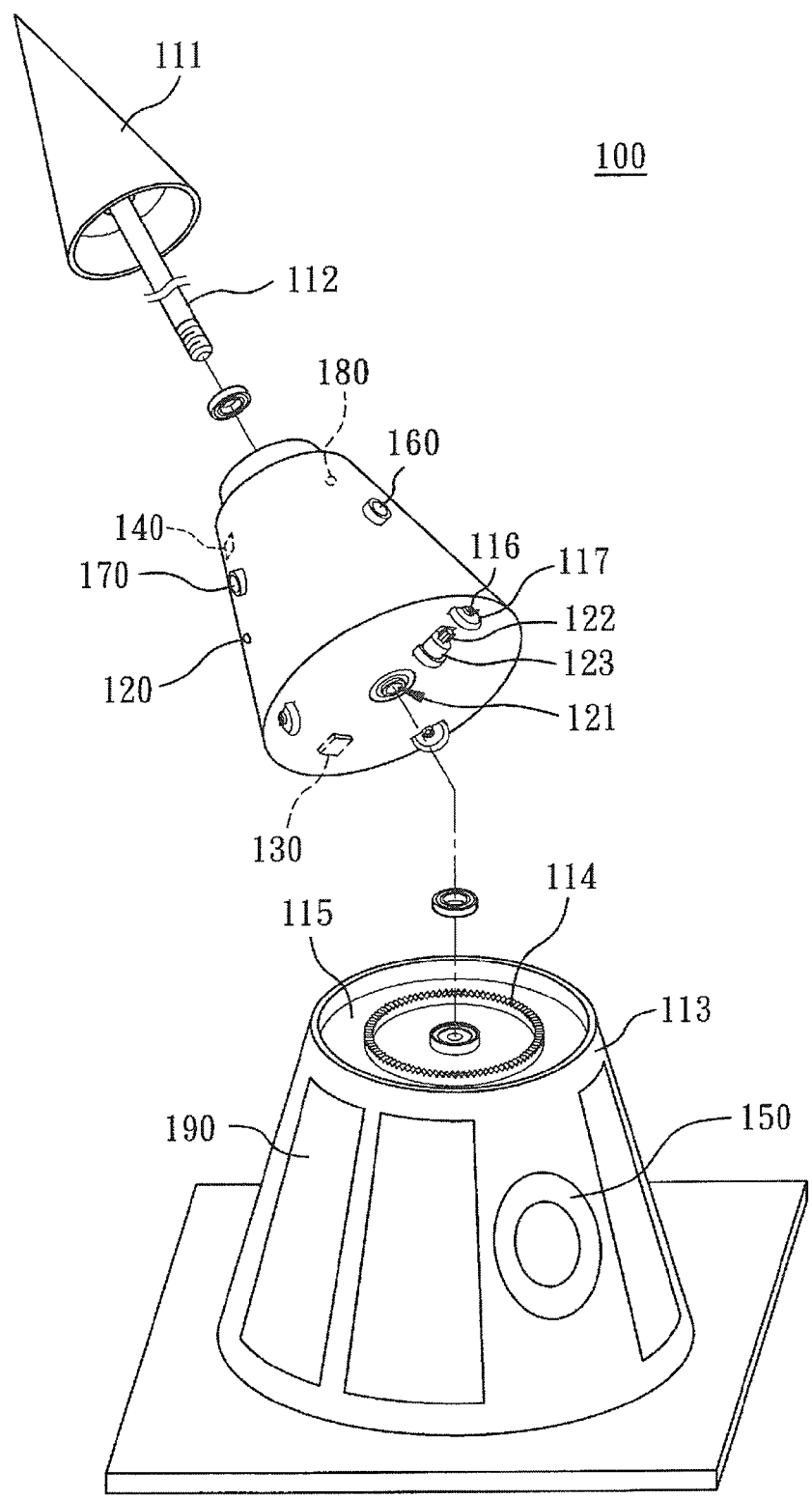
FIG. 2 is an exploded, perspective view of the intelligent construction cone of FIG. 1.
Figure 3:
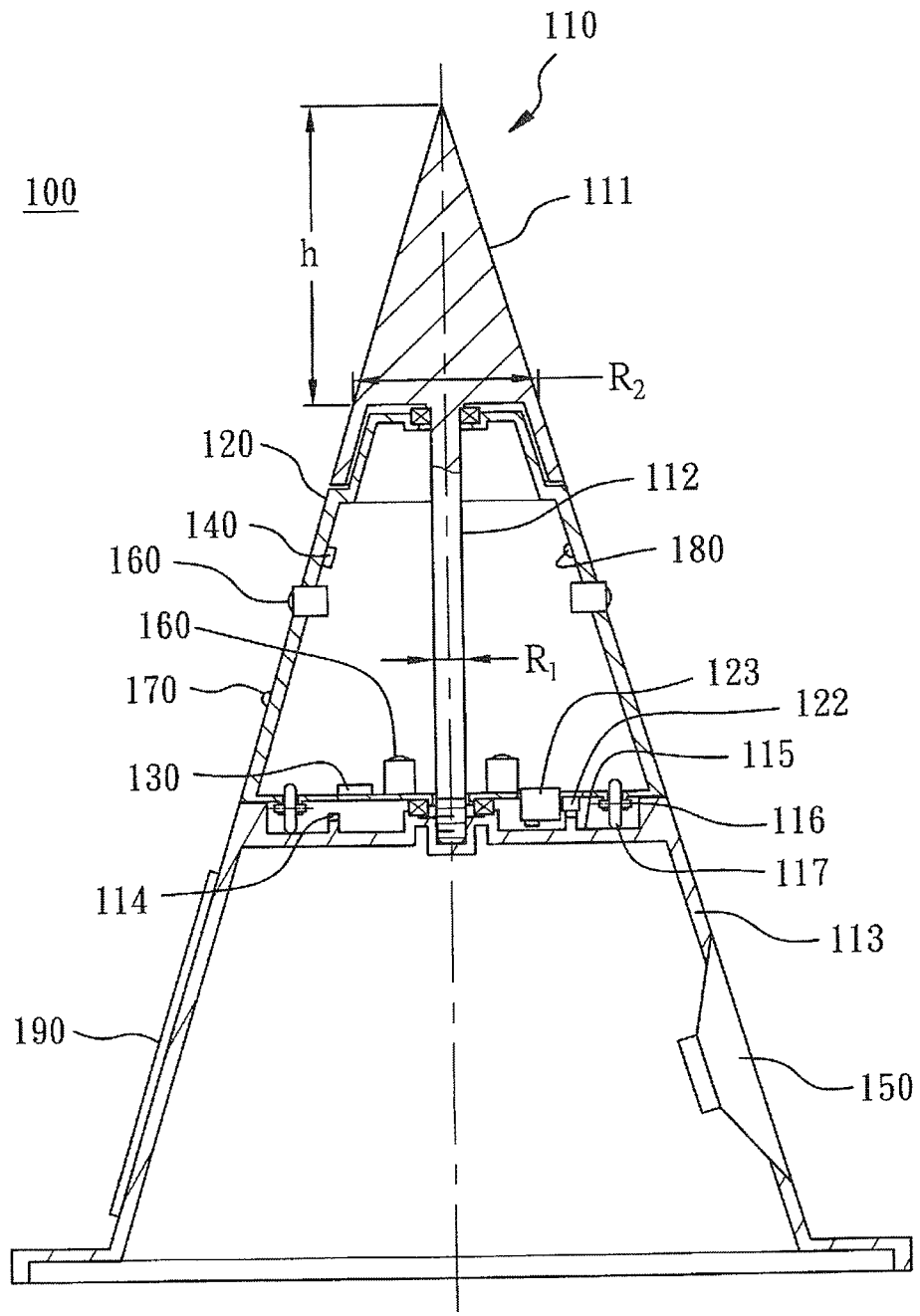
FIG. 3 is a cross sectional view of the intelligent construction cone of FIG. 1.

FIG. 2 is an exploded, perspective view of the intelligent construction cone of FIG. 1. FIG. 3 is a cross sectional view of the intelligent construction cone of FIG. 1. The intelligent construction cone 100 is in the form of a cone in the embodiment shown in FIGS. 2 and 3. The body 110 includes a conic portion 111, a neck portion 112, and a base 113. An end of the neck portion 112 is connected to the conic portion 111. In this embodiment, the neck portion 112 is in the form of a cylinder extending from a bottom side of the conic portion 111 having a height h, with the cylinder having a maximal outer diameter R1 smaller than a maximal outer diameter R2 of the conic portion 111.

The other end of the neck portion 112 is detachably connected to the base 113. The base 113 includes a track 114 surrounding the neck portion 112. In this embodiment, the base 113 is in the form of a truncated cone, with the track 114 formed on a side of the truncated cone facing the conic portion 111.

The light pervious body 120 is rotatable relative to the body 110. The light pervious body 120 includes a passage 121, a rotating device 122, and a driving device 123. The passage 121 is located in the light pervious body 120. The neck portion 112 is extended through the passage 121 and connected to the base 113. Thus, the light pervious body 120 is rotatable about the neck portion 112 that defines a rotating axis.

The rotating device 122 is mounted to the light pervious body 120 and can drive the light pervious body 120 to rotate along the track 114. In this embodiment, the rotating device 122 includes a gear that is fixed to the light pervious body 120 via the driving device 123.

Note that a guiding groove 115 is defined in the base 113, and three positioning pegs 116 and three guiding wheels 117 are provided to avoid direct contact between the light pervious body 120 and the base 113. The positioning pegs 116 and the guiding wheels 117 are mounted to the light pervious body 120 and located corresponding to the track 114, with each guiding wheel 117 rotatably mounted to one of the positioning pegs 116.

The driving device 123 is connected to the rotating device 122 and drives the rotating device 122. In this embodiment, the driving device 123 is a servo-stepper motor. Specifically, the servo-stepper motor drives the gear that moves along the track 114 to rotate the light pervious body 120.

The controller 130 is coupled to the driving device 123 by signal connection. The controller 130 is the control center of the whole intelligent construction cone 100. A user can preset the parameters of the controller 130 to control the speed of the rotating device 122.

Figure 4A:
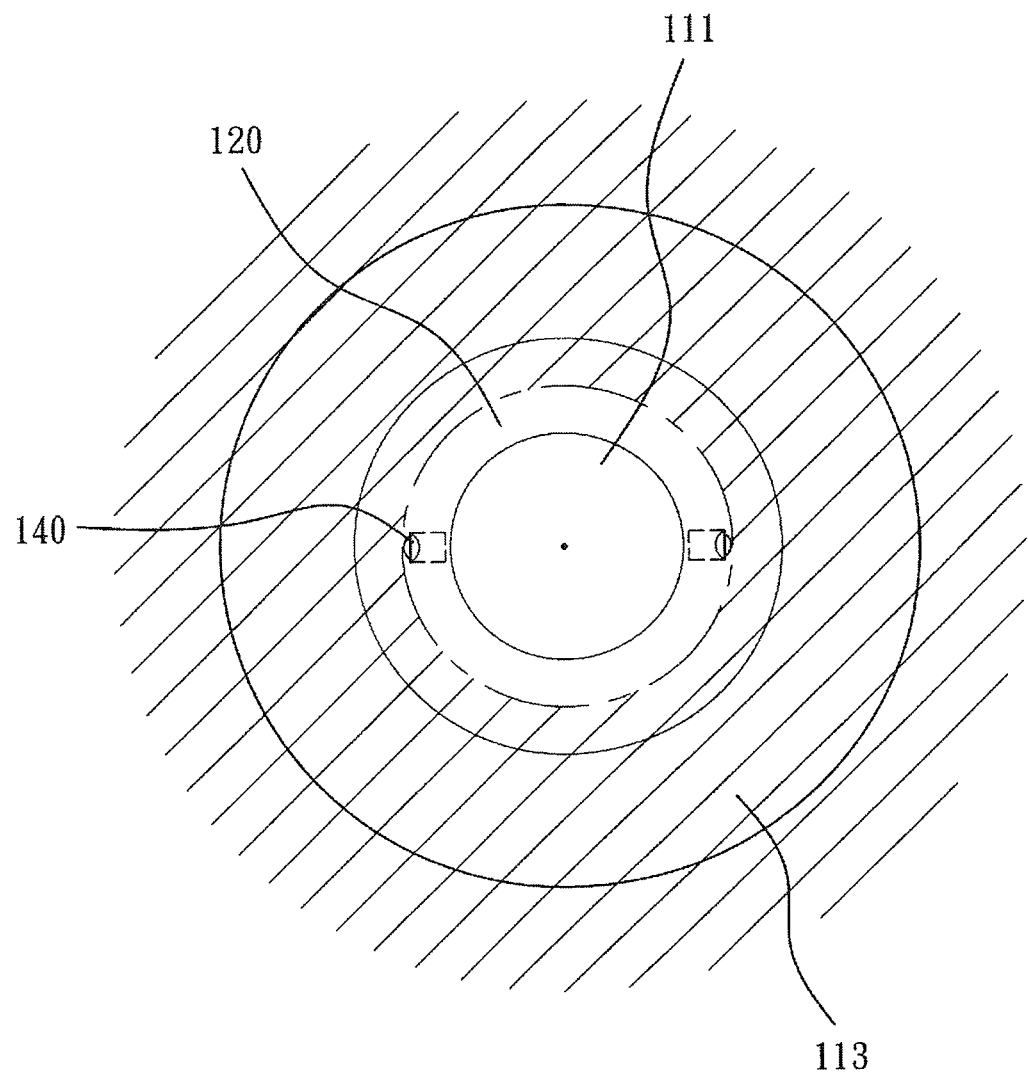
FIG. 4A is a top view of the intelligent construction cone of FIG. 1.
Figure 4B:
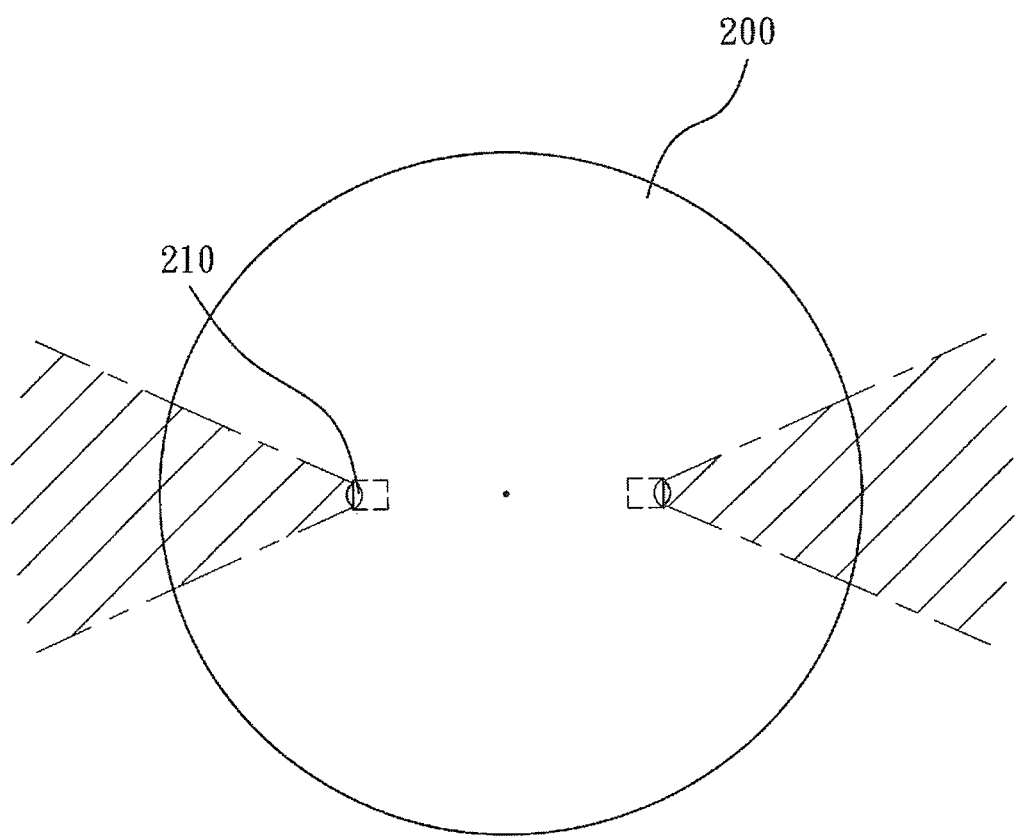
FIG. 4B is a top view of a conventional construction cone.

The distance detector 140 is coupled to the controller 130 by signal connection. The distance detector 140 sends a distance signal to the controller 130, and rotation of the light pervious body 120 eliminates the detection dead angle of the distance detector 140. Please refer to FIG. 4A showing a top view of the intelligent construction cone of FIG. 1 and to FIG. 4B showing a top view of a conventional traffic cone. A distance detector 210 mounted on a conventional construction cone 200 is fixed, such that the distance detector 210 can only detect two limited angular areas, as shown by the two areas with parallel, inclined lines in FIG. 4B. As a result, the effect of the construction cone 200 is limited. By contrast, by using the distance detector 140 and the rotating device 122, the limitation in the conventional construction cone 200 is eliminated. Namely, the distance detector 140 can operate 360° without any detection dead angle, as shown by FIG. 4A. In this embodiment, the distance detector 140 is a supersonic rangefinder. Particularly, the rotating device 122 allows 360° detection of a single distance detector 140, reducing the number of the expensive distance detector 140 and, hence, significantly reducing the costs.

A humidity sensor 170 is coupled to the controller 130 by signal connection to detect environmental humidity and to send a signal indicative of the environmental humidity to the controller 130.

Still referring to FIGS. 2 and 3, the warning device 150 is coupled to the controller 130 by signal connection and provides a warning message in response to the distance signal. In this embodiment, the warning device 150 is a buzzer. Nevertheless, the warning device 150 can be of other types that can produce sounds to provide a warning effect.

The lighting device 160 is coupled to the controller 130 by signal connection to provide illumination, eliminating the disadvantages of conventional construction cones that depend on ambient light and, hence, fail to provide expected warning effects. In this embodiment, the lighting device 160 can be mounted in and on the light pervious body 120. Through provision of the light pervious body 120 and the lighting device 160, the utility of the intelligent construction cone 100 is significantly enhanced by using the lighting device 160 that actively illuminates to replace conventional passive reflection. Furthermore, through cooperation with the distance detector 140 and the warning device 150, the lighting device 160 can provide flickering light to provide an enhanced warning effect for the passersby. The lighting device 160 can be a light-emitting diode. The warning device 150 and the lighting device 160 can cooperate with the distance detector 140 to provide different warning effects according to the distance between the object and the distance detector 140. For example, the warning device 150 produces higher sounds and the lighting device 160 emits brighter light beams as the object moves closer to the distance detector 140.

In this embodiment, the intelligent construction cone 100 further includes a humidity sensor 170, a light sensor 180, and a solar power generating device 190. The humidity sensor 170 is coupled to the controller 130 by signal connection to detect environmental humidity and transmit a signal indicative of the environmental humidity to the controller 130. In actual use in a rainy day, even if the sky is not dark, the visibility is decreased by the rain, and the road surface is wet and increases the risks of accidents. More carefulness is required. The intelligent construction cone 100 of this embodiment can automatically detect the rain and operates if necessary. Furthermore, more warning effects are added in rainy days, such as the brightness and the flickering mode of the lighting device 160 and/or the sounds of the warning device 150.

The light sensor 180 is coupled to the controller 130 by signal connection to detect environmental brightness and transmit a signal indicative of the environmental brightness to the controller 130. The light sensor 180 and the humidity sensor 170 can activate operations when necessary. The light sensor 180 detects the environmental brightness, providing a function different from the humidity sensor 170. As an example, in a cloudy day or dark night, the light sensor 180 can activate the intelligent construction cone 100 to operate.

The solar power generating device 190 is mounted on the body 110 to provide the light pervious body 120 with electricity. In addition to an external power source, the intelligent construction cone 100 can produce the electricity itself by using the solar power generating device 190, significantly increasing the utility of the intelligent construction cone 100.

In view of the foregoing, by using the lighting device 160 that provides active warning lights, the intelligent construction cone 100 eliminates the disadvantages of passive reflective warning, increasing the utility of the intelligent construction cone 100. Furthermore, the rotating device 122 allows the distance detector 140 to proceed with 360° detection of objects adjacent to the body 110, significantly increasing the alarm distance, range, and angle while effectively eliminating the dead angle.

Although specific embodiments have been illustrated and described, numerous modifications and variations are still possible without departing from the essence of the invention. The scope of the invention is limited by the accompanying claims.

The invention claimed is:

1. An intelligent construction cone comprising:
   a body including a conic portion, a neck portion, and a base, with the neck portion including an end connected to the conic portion, with the neck portion including another end detachably connected to the base, with the base including a track surrounding the neck portion;

a light pervious body rotatable relative to the body, with the light pervious body including a passage, with the neck portion extended through the passage and connected to the base, with a rotating device mounted to the light pervious body, with the rotating device driving the light pervious body to rotate along the track, with a driving device connected to the rotating device, with the driving device driving the rotating device to rotate;

a controller coupled to the driving device by signal connection;

a distance detector coupled to the controller by signal connection, with the distance detector sending a distance signal to the controller, with the distance detector jointly rotatable with the light pervious body to eliminate detection dead angle;

a warning device coupled to the controller by signal connection, with the warning device generating a warning message responsive to the distance signal;

a lighting device coupled to the controller by signal connection, with the lighting device providing illumination;

a light sensor coupled to the controller by signal connection, with the light sensor detecting environmental brightness; and a humidity sensor coupled to the controller by signal connection, with the humidity senor detecting environmental humidity, with the warning message and intensity of the illumination being adjusted according to a distance between an object and the distance detector, the environmental brightness, and the environmental humidity.

2. The intelligent construction cone as claimed in claim 1, wherein the base further includes a guiding groove.

3. The intelligent construction cone as claimed in claim 2, further comprising:

a positioning peg mounted to the light pervious body and located corresponding to the track; and a guiding wheel rotatably mounted to the positioning peg.

4. The intelligent construction cone as claimed in claim 1, wherein the lighting device is a light-emitting diode.

5. The intelligent construction cone as claimed in claim 1, wherein the warning device is a buzzer.

6. The intelligent construction cone as claimed in claim 1, wherein the neck portion is a cylinder extending from a bottom side of the conic portion.

7. The intelligent construction cone as claimed in claim 1, wherein the distance detector is a supersonic rangefinder.

8. The intelligent construction cone as claimed in claim 1, further comprising: a solar power generating device mounted to the body, with the solar power generating device providing the light pervious body with electricity.

* * * * *